United States Patent [19]

Tanaka et al.

[11] Patent Number: 4,874,993

[45] Date of Patent: Oct. 17, 1989

[54] SENSORLESS BRUSHLESS MOTOR

[75] Inventors: Masato Tanaka; Toshiya Kan, both of Tokyo, Japan

[73] Assignee: Sony Corporation, Tokyo, Japan

[21] Appl. No.: 251,236

[22] Filed: Sep. 30, 1988

[30] Foreign Application Priority Data

Oct. 31, 1987 [JP] Japan .............................. 62-276833

[51] Int. Cl.$^4$ .............................................. H02P 6/02
[52] U.S. Cl. ...................................... 318/254; 318/138
[58] Field of Search ......................... 318/138, 254, 439

[56] References Cited

U.S. PATENT DOCUMENTS

| | | | |
|---|---|---|---|
| 4,070,606 | 1/1978 | Morozumi et al. | 318/138 X |
| 4,132,930 | 1/1979 | Schalk | 318/254 X |
| 4,136,308 | 1/1979 | King . | |
| 4,295,085 | 10/1981 | Lafuze | 318/254 X |
| 4,449,086 | 5/1984 | Hoffman et al. . | |
| 4,473,781 | 9/1984 | Nielsen | 318/254 |
| 4,484,123 | 11/1984 | Raducanu . | |
| 4,603,283 | 7/1986 | Oltendorf | 318/254 |
| 4,651,068 | 3/1987 | Meshkat-Razavi | 318/439 X |
| 4,712,050 | 12/1987 | Nagasawa et al. | 318/254 |

FOREIGN PATENT DOCUMENTS 0123807 2/1984 European Pat. Off. .

Primary Examiner—Bentsu Ro
Attorney, Agent, or Firm—Lewis H. Eslinger; Jay H. Maioli

[57] ABSTRACT

In a brushless motor of the kind not employing a sensor for detecting rotor position, a rotational reference position of the rotor is detected based on an induction voltage in a stator excitation coil, and an energization switching point of the stator excitation coil is determined to occur a delayed time from the reference position. The time delay is increased or decreased in response to the rotational speed of the motor, so that energization switching of the excitation coils is performed at the optimum position in accordance with corresponding changes in the rotational speed of the motor. Signal masking is performed so that noise generated by the excitation coil switching does not interfere with the detection of the rotor reference position.

20 Claims, 5 Drawing Sheets

SENSORLESS BRUSHLESS MOTOR

BACKGROUND OF THE INVENTION

1. Field of the Invention

This invention relates generally to a brushless motor and, more particularly, to a brushless motor in which a rotor position sensor is not required.

2. Description of the Background

A conventional brushless motor typically detects the angular position of the rotor by using a position sensor, such as a Hall-effect element. Upon determining the rotational position of the rotor a switching pulse is produced that switches the phases of the stator coil energization based upon the detected signal. Use of the Hall-effect elements, however, increases the cost of the motor and also increases the complexity of the wiring and the number of steps employed in assembling the motor.

This applicant has previously proposed a brushless motor that does not require a position sensor, such as the known Hall-effect element, and this proposed brushless and sensorless motor is described in Japanese Patent Application No. 61-125413. In this proposed brushless motor, the voltage induced in the stator coil by the rotor magnet is detected and utilized to form pulses that indicate specific angular positions of the rotor, and this pulsed signal is delayed by a fixed value to form the energization timing pulses at the respective switching positions.

In order to produce these stator coil energization timing pulses in the above-identified previously proposed sensorless brushless motor, a fixed time delay device is employed, such as a monostable multi-vibrator. This proposed system has the drawback in that it is not applicable to motors in which the speed is controlled over a relatively wide range. For example, the brushless motor utilized in a constant linear velocity (CLV) kind of video disk player cannot easily be implemented with the previously proposed system. In the proposed sensorless brushless motor in order to start the motor, special energization pulses are generated at fixed intervals and with fixed durations regardless of the initial angular position of the rotor. Therefore, the energization angle of the stator coils is not synchronized with the rotational angle of the rotor resulting in poor starting characteristics.

Furthermore, because the angular position of the rotor is detected based on the induced voltages in a stator excitation coil, substantial noise, in the form of spikes, is generated at each energization switching point in such coil. The noise spikes, as well as other noises in the detection system, are then mixed in the detection signal that is employed to determine rotor angular position. Therefore, because of this noise the rotor energization switching angles, the duration of the energization pulses, as well as the polarities of the energization pulses cannot be determined in a stable fashion.

OBJECTS AND SUMMARY OF THE INVENTION

Accordingly, it is an object of the present invention to provide a sensorless brushless motor that can eliminate the above-noted defects inherent in the prior art.

Another object of this invention is to provide a sensorless brushless motor that can automatically control and determine the coil energization switching positions at specific electrical angles regardless of the rotational speed, even though the angular position of the rotor is determined based upon an induced voltage in the energization coil.

A further object of this invention is to provide a sensorless brushless motor that upon starting of the motor can produce energization switching pulses that are equivalent to a brushless motor that employs separate rotor position sensors and that can improve the rise time, that is, the speed versus time starting characteristics of such sensorless brushless motor by controlling the optimum energization angle.

It is a still further object of the present invention to provide a sensorless brushless motor that can perform energization duration control to obtain efficient motor drive even though the rotational speed of the motor is continuously changed over a relative wide range, such as might be required of the spindle motor of a CLV disk player.

Still another object of the present invention is to provide a sensorless brushless motor that can remove noise spikes from the detected induced voltage in the excitation coil and can distinguish the correct reference angular position from such induced voltage and can prevent erroneous operation of the energization switching, so that stable operation of the sensorless brushless motor is obtained.

In accordance with an aspect of the present invention, a reference position detector is provided in a sensorless brushless motor for detecting a reference position of rotor rotation based upon a voltage induced in a stator excitation coil. A delay circuit produces a delay clock signal, pulses of which are delayed by a predetermined amount from the reference position as detected by the reference position detector. A delayed pulse signal is then produced based upon the delay clock signal from the delay circuit and a switching signal generator generates an energization switching signal based upon the delay signal that is then fed to a switching circuit that controls the energization of the stator coil. A control circuit detects the rotational speed of the rotor and controls the delay amount in the delay circuit, thereby adjusting the energization switching position of the stator coils in accordance with the rotational speed of the motor. A masking circuit is also provided that forms a masking signal based on the delay clock signal pulses. This masking signal suppresses the noise spikes in the stator coils that would otherwise produce a false detection of the reference position.

The above and other objects, features, and advantages of the present invention will become apparent from the following detailed description of illustrative embodiments thereof, to be read in conjunction with the accompanying drawings in which like reference numerals represent the same or similar elements.

DETAILED DESCRIPTION OF PREFERRED EMBODIMENTS

Figure 1:
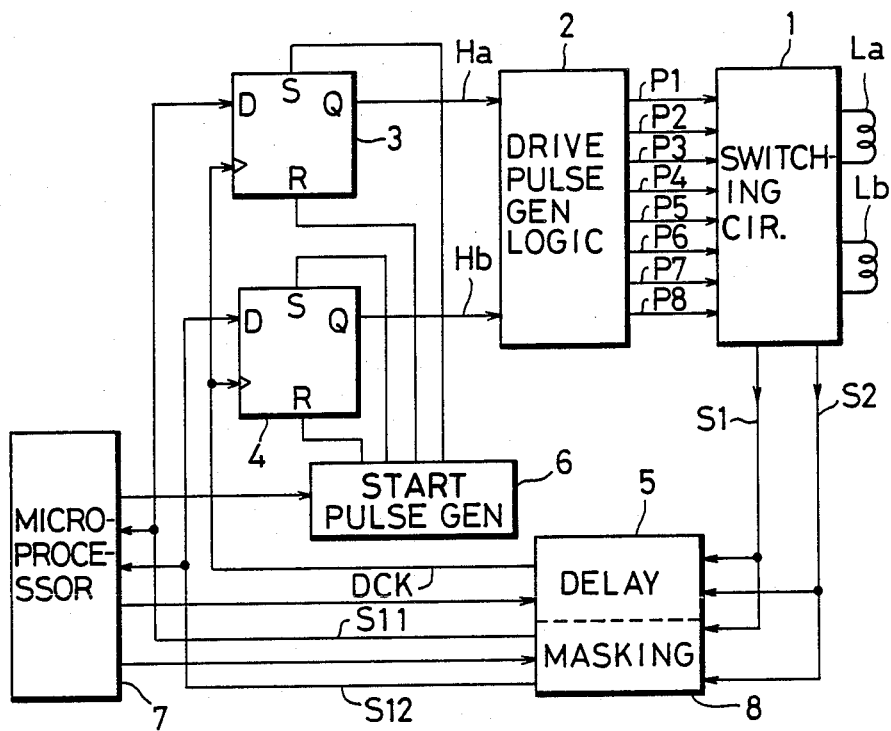
FIG. 1 is a block diagram of a drive circuit for a sensorless brushless motor according to an embodiment of the present invention.
Figure 3A:
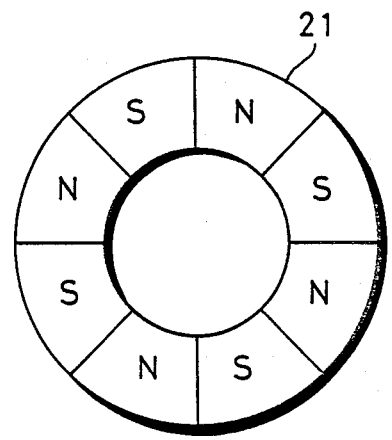
FIGS. 3A and 3B are plan views of a rotor and a stator, respectively, of the sensorless brushless motor of FIG. 1.
Figure 3B:
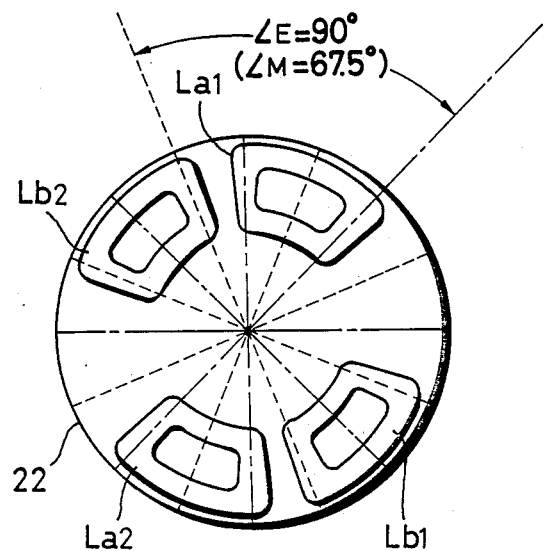

FIG. 1 shows a drive circuit for a sensorless brushless motor, which in this embodiment is assumed to be of the two-phase bidirectional energization kind. Such motor would then employ a rotor 21 as shown in FIG. 3, which includes magnets arranged to form eight poles. Similarly, FIG. 3B is a plan view of a stator for a motor according to the present invention having two-phase coils La1, La2 and Lb1, Lb2 having an electrical angle of 90° and a mechanical angle of 67.5° formed on the stator base 22. The stator coils consist of series coils La1 and La2, and Lb1 and Lb2, respectively, which are arranged at electrically in-phase positions, that is, arranged at an integer multiple of an electrical angle of 360°. The winding pitch of each coil is an electrical angle of 180° or a mechanical angle of 45°.

The two-phase coils La and Lb are reciprocally connected to an energization circuit by a switching circuit, shown at 1 in FIG. 1. Such reciprocal connection or switching is also known as bidirectional switching.

Figure 2:
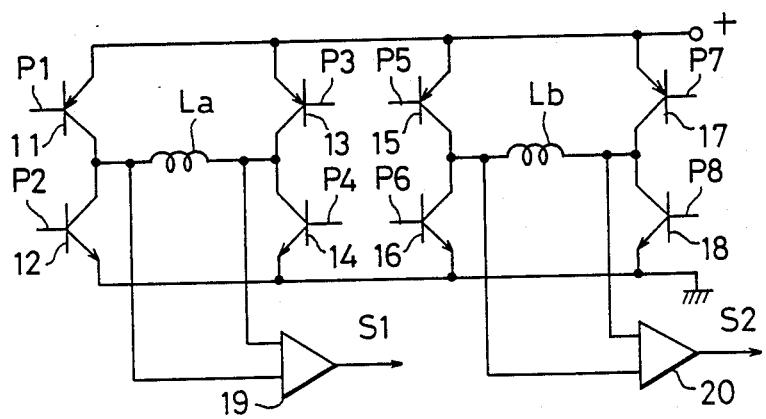
FIG. 2 is a circuit diagram showing the switching circuit of FIG. 1 in more details.

FIG. 2 shows switching circuit 1 of FIG. 1 in more detail, in which transistors 11, 12, 13, and 14 are bridge-connected to the coil La and transistors 15, 16, 17, and 18 are bridge-connected to coil Lb. Transistors 11 through 18 are then turned on every electrical angle of 90° by drive pulses P1 through P8 that are connected to the base circuits of transistors 11 through 18, respectively. Accordingly, the ends of each load or coil, La and Lb, are selectively connected between the positive terminal (+) of a power supply and ground, thereby providing a driving force for the motor.

Figure 4A:
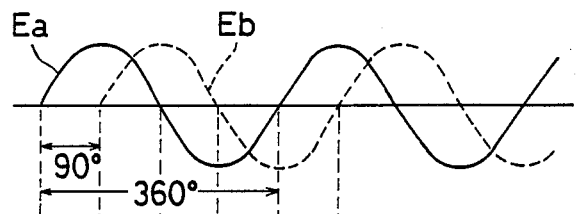
FIGS. 4A–4E represent waveforms of signals present in the motor of FIG. 1 during operation thereof.
Figure 4B:
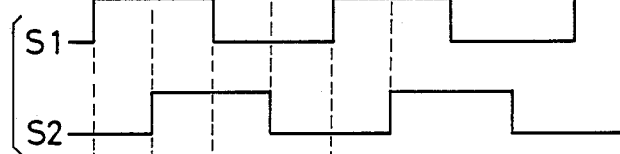

As is well known, during rotation of the motor sinusoidal induction voltages Ea and Eb with a mutual phase difference of 90° are generated across coils La and Lb by the rotor magnets. These induced sinusoidal voltages are shown in FIG. 4A, with voltage Ea shown by a solid line and voltage Eb shown by a broken line, with a 90° phase difference therebetween. The induction voltages Ea and Eb are then wave shaped at the zero crossing points, that is, at the AC neutral potentials, by comparators 19 and 20, respectively, having inputs connected to the two ends of coils La and Lb, respectively. Thus, pulse signals S1 and S2 (FIG. 4B) having a mutual phase difference of 90° corresponding to the induction voltages Ea and Eb are obtained as the outputs from comparators 19 and 20. These pulse signals S1 and S2 are therefore synchronized and phase-locked with the induction voltages Ea and Eb and their high and low levels correspond to the respective AC polarities of the induced voltages, as shown in FIG. 4B. Thus, the pulse signals S1 and S2 indicate a reference angular position of the rotor relative to the stator coils La and Lb.

Pulse signals S1 and S2 are then fed to a delay circuit 5 that forms delay clock signal DCK, the leading edges of which are delayed by a time T from the leading and trailing edges of signals S1 and S2. The manner in which clock signal DCK is produced will be shown in detail below. Thus, the trailing edges of clock signal DCK are synchronized with signals S1 and S2 and time T corresponds to an electrical angle of 45°. Therefore, an energization angle having a 90° width with a leading edge corresponding to a 45° position from the magnetic pole boundary corresponding to the reference position of the rotor magnet 21 can be obtained without an angular position sensor, which is typically required. As will be described hereinbelow, the time T will be variably controlled by a microprocessor 7 so that it is always kept at an electrical angle 45°, even if the rotational speed of the motor is varied.

Figure 4C:
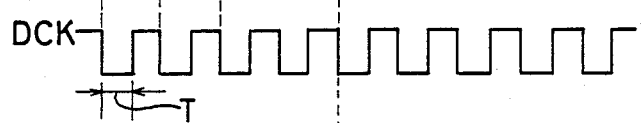
Figure 4D:
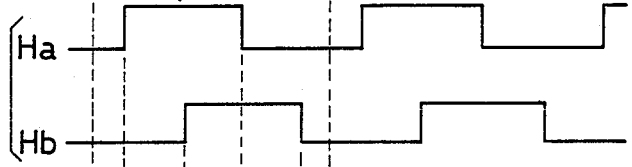
Figure 4E:
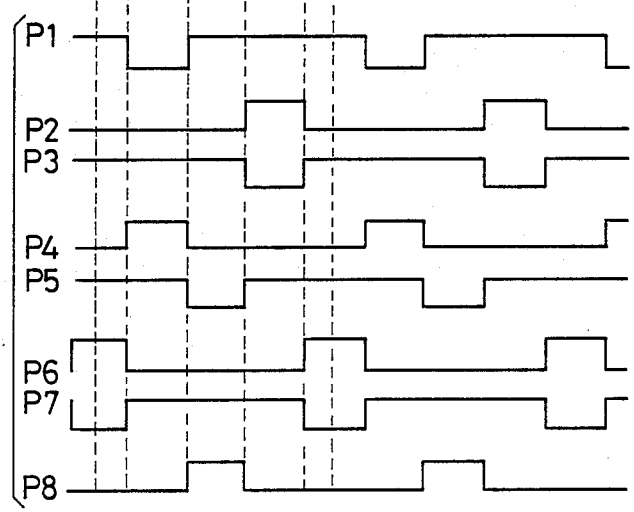

Pulse signals S1 and S2 from switching circuit 1 in FIG. 1 are also fed to a masking circuit 8, which can optionally share common elements with delay circuit 5. Masking circuit 8 transforms pulse signals S1 and S2 into signals S11 and S12, respectively, which are then fed to the D inputs of D-type flip-flops 3 and 4, respectively. The operation of the masking circuit 8 will be explained hereinbelow and at this time it is noted that masking circuit 8 removes the noise pulses included in the pulse signals S1 and S2 at all portions other than the zero crossing sections of induction voltage signals Ea and Eb. Because the noise pulses are based upon the energization switching of the stator coils, the noises are generated at specific positions and, thus, the masking position and the widths of the masking pulses can be controlled by the control data according to the motor speed from the microprocessor 7. Flip-flops 3 and 4 receive the delayed clock signal DCK at the respective clock inputs thereof and, thus, flip-flops 3 and 4 produce pulse signals Ha and Hb, delayed by 45° relative to signals S1 and S2, as shown in FIG. 4D. These pulse signals Ha and Hb are fed to a drive pulse generator logic circuit 2 that forms the bidirectional energization pulses P1 through P8 at every 90° electrical, which drive signals are shown in FIG. 4E. It is these pulses P1 through P8 that are utilized to turn on and off transistors 11 through 18 of FIG. 2 and thereby control the rotation of the motor. Drive pulse generator logic 2 produces the bidirectional energization pulses P1 through P8 by straight-forward logic processing or encoding so that the polarities of the magnetic poles of the rotor correspond to the energization polarities during the 90° wide intervals (45°–135° and 225°–315°) of the magnetic poles opposite coils La and Lb. In this fashion, rotational torque in one direction is generated.

Of course, when rotor magnet 21 is not rotating and is stopped relative to stator, no voltages will be induced in the stator coils La and Lb. Accordingly, when it is desired to start the motor, a start pulse signal is generated by a start pulse generator 6 for a period of time. Start pulse generator 6 is controlled by microprocessor 7 to which the motor start switch (not shown) is connected. Start pulse generator 6 produces start pulse signals connected to the set and reset terminals of flip-flops 3 and 4, thereby forming two-phase pulse signals similar to pulse signals Ha and Hb shown in FIG. 4D. Accordingly, when the motor is started, coils La and Lb are separately excited by the start signals from start pulse generator 6 and rotor 21 is caused to rotate in a predetermined rotational direction depending upon the phase relationship between the start signals produced by start pulse generator 6 as determined by microprocessor 7.

Figure 5:
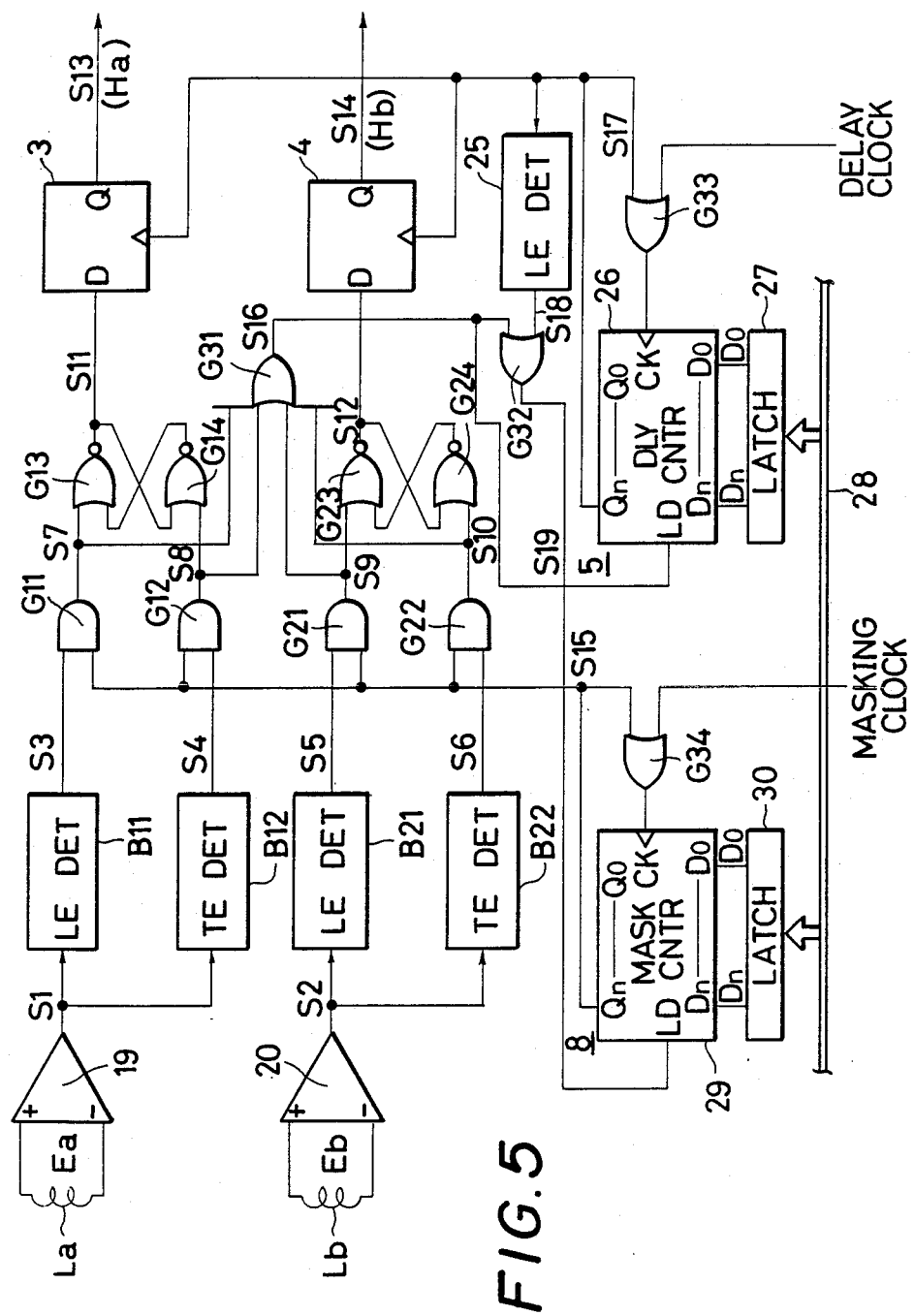
FIG. 5 is a schematic diagram showing elements of the drive circuit of FIG. 1 in more detail.
Figure 6:
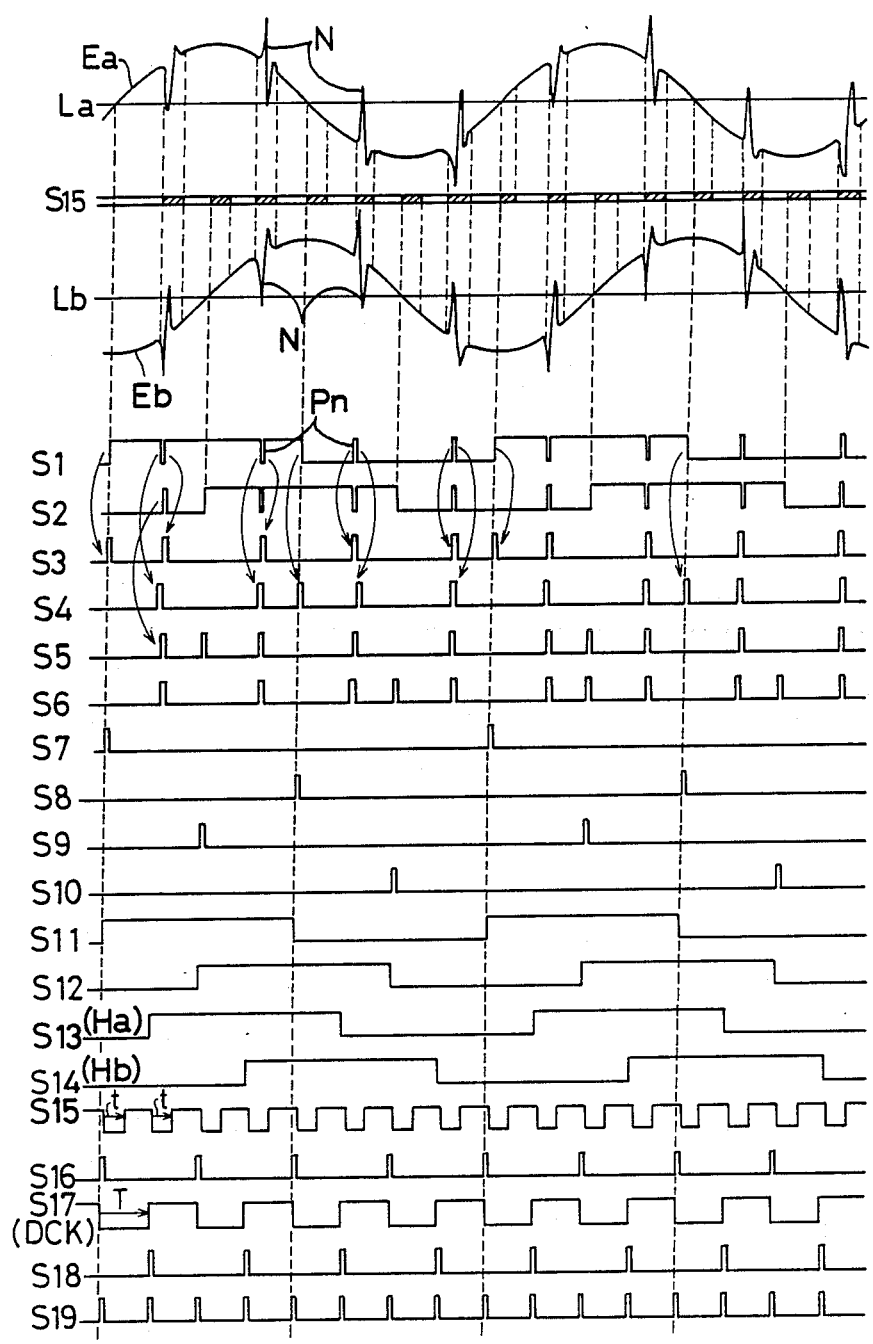
FIG. 6 is a waveform chart showing the waveforms of signals present in the circuit of FIG. 5 during operation thereof.

Delay circuit 5 of FIG. 1 is shown in more detail in FIG. 5 as is masking circuit 8. FIG. 6 represents waveforms found throughout the circuit of FIG. 5 during operation thereof. More specifically, the induction voltages Ea and Eb induced respectively in coils La and Lb are applied to comparators 19 and 20, respectively, and are so-called zero-cross shaped therein. Comparators 19 and 20 form the pulse signals S1 and S2 also shown in FIG. 6, and in accordance with typical comparator operation comparators 19 and 20 in addition to detecting induced voltages Ea and Eb will also detect the noise spikes caused by the stator coil switching. Such noise spikes are shown at N in waveforms Ea and Eb in FIG. 6, and because they are generated at the current switching positions noise will be found at the corresponding points 45°, 135°, 225°, and 315°, of the signals Ea and Eb. Noise spikes N will be detected by comparators 19 and 20 and will result in noise pulses Pn being present in pulse signals S1 and S2. It is these noise pulses Pn that will be removed by masking circuit 8.

Output S1 from comparator 19 is fed to a leading edge detector B11 and a trailing edge detector B12, and output S2 of comparator 20 is fed to a leading edge detector B21 and a trailing edge detector B22. Thus, signal S1 is developed into edge pulses S3 and S4 as shown in FIG. 6, and signal S2 is developed into edge pulses S5 and S6, as shown in FIG. 6. These edge pulses S3, S4, S5, and S6 are fed to masking AND gates G11, G12, G21, and G22, respectively. As will be explained hereinbelow, these masking AND gates G11, G12, G21, and G22 serve to remove the noise pulses Pn, with the resultant signals being shown in FIG. 6 as S7, S8, S9, and S10, respectively. Edge pulses S7 and S8 are fed to a RS flip-flop formed of NOR gates G13 and G14, and edge pulses S9 and S10 are fed to a second RS flip-flop formed of NOR gates G23 and G24. These two sets of NOR gates then produce pulse signals S11 and S12, as shown in FIG. 6. As may be seen, because of the masking effect pulse signals S11 and S12 have the noise pulses Pn removed therefrom at points other than the zero-cross points of the pulse signals S1 and S2.

As shown in FIG. 1, signals S11 and S12 are fed to the D inputs of D-type flip-flops 3 and 4, which act to form delayed pulses S13 and S14 that correspond to signals Ha and Hb in FIG. 6, respectively.

Outputs S7, S8, S9, and S10 from masking AND gates G11, G12, and G21, and G22 are also connected to a multiple input OR gate G31, so that a pulse signal indicating two edges of the two-phase signal is formed, that is, the pulses indicate the leading and trailing edges of each of the two signals, as shown in S16 in FIG. 6. Signal S16 is connected as a load pulse to terminal LD of a delay counter 26, which forms the delay circuit 5 shown in FIG. 1. The load input of counter 26 then causes control data $D_0$ through $D_n$ corresponding to the rotational speed of the motor to be input to counter 26 from a data bus 28 of microprocessor 7 through a latch circuit 27. Thereafter, counter 26 counts the delay clock signals having a predetermined frequency fed in from an external clock circuit (not shown) through an OR gate G33 in response to the load pulse S16 based on the load data. Accordingly, delay counter 26 will generate an nth-bit (most significant bit) output with the leading edge occurring after a time T, as shown in waveform S17 of FIG. 6. The frequency of the delay clock signal is based on the resolution or resolving power or resolving efficiency, of counter 26.

The locations of load pulses in the waveform S16 correspond to electrical angles of 0°, 90°, 180°, and 270° and time T is controlled, that is, lengthened or shortened, in accordance with the load data, as fed in from microprocessor 7. Thus, time T is controlled to correspond to each 45° width between the electrical angles 0° and 45°, between 90° and 135°, between 180° and 225°, and between 270° and 315° regardless of change in rotational speed of the motor. In other words, at low speed time T is lengthened and at high speed time T is shortened.

Delay counter 26 then counts the clock signals fed in through OR gate G33 and upon reaching the most significant bit Qn the output of counter 26 goes high. This output of counter 26 is connected to another input of OR gate G33, thereby blocking the clock input to counter 26. Therefore, the most significant bit output Qn of counter 26, shown at S17 in FIG. 6, remains at a high level until the next load pulse S16 is fed to counter 26 to reset the counter and, thus, the most significant bit level output Qn falls to a low level. Counter output S17 is also fed to the clock inputs of flip-flops 3 and 4 as the delayed clock signal DCK in the circuit of FIG. 1, which signal waveforms are also shown in FIG. 4C, thereby forming the delayed pulse signals Ha and Hb, which correspond respectively to signals S13 and S14 in FIG. 6.

The most significant bit output from delay counter 26 is also fed to a third leading edge detector 25, so that a pulse representing the leading edge indicated by waveform S18 in FIG. 6 is formed. Edge pulse S18 represents the positions at electrical angles of 45°, 135°, 225° and 315° of respective phases of the two-phase signal. This signal is also fed to an OR gate G32 that forms an OR output signal S19 from the edge pulse signal S18 and the output pulse S16, which corresponds to 0° and 180° electrical, of multiple input OR gate G31. Because signal S19 is derived from signal S17, the interval between pulses of signal S19 is lengthened or shortened in accordance with delay time T, however, the electrical phase angle remains constant at 0°, 45°, 135°, 180°, 225°, and 315°.

This OR gate output signal S19 is fed as the load pulse to input LD of a masking counter 29, which comprises masking circuit 8 of FIG. 1. Masking counter 29 fetches control data corresponding to the rotational speed of the motor from data bus 28 of microcomputer 7 through a latch circuit 30, in an operation just as in delay counter 26. Masking counter 29 counts masking clocks provided by an external clock circuit (not shown) at a predetermined frequency by receiving a clock signal through an OR gate G34 at clock input CK. The frequency of the masking clock is determined by the resolution or resolving power, or the resolving efficiency, of masking counter 29. Thus, masking counter 29 generates from the most significant bit (MSB) position Qn a masking pulse signal that falls at angular positions of 0°, 180°, 45°, 135°, and 315°, as indicated in pulse signal S15 in FIG. 6, in which the masking pulse rises after lapse of a predetermined time period t. Because the masking clock input to masking counter 29 is connected through OR gate G34 that has as another input signal MSB signal S15 from masking counter 29 when MSB signal goes to a high level, the masking clock is disabled by OR gate G34 and the counting operation is interrupted until the next load pulse on signal S19 is fed to masking counter 29.

As described above, the masking width t is varied in accordance with the rotational speed of the motor as determined by the microprocessor 7, however, in an alternate embodiment, the masking width t could assume a fixed value regardless of the rotational speed of the motor.

The masking pulse S15 is also fed to the masking AND gates G11, G12, G21, and G22 so that the AND gates are closed during the low-level period t of the masking pulse S15. This has the effect that predetermined periods immediately following the zero-cross detection at 0° and 180°, and at predetermined periods immediately after the current switching timings at 45°, 135°, 225°, and 315°, are masked, as indicated by the induction voltage waveforms Ea and Eb in FIG. 6.

Thus, even if low level noise pulses are superimposed on induced stator voltages Ea and Eb near the zero-crossing points and the outputs S1 and S2 from comparators 19 and 20 fluctuate accordingly, once the leading edge of pulse S1 or S2 is detected, these noise pulses are ignored by means of the masking signal. Accordingly, the pulse signals S11 and S12 having a correct period in which positive and negative half waves of the induced voltages respectively correspond to the high and low levels can be obtained. Similarly, because noise spikes generated at the stator coil switching points can be removed by masking immediately after the current switching, the detection at crossing points 0° and 180° are not interfered with. Thus, switching timings can be accurately determined by utilizing the above-described digital delay because the 0° and 180° positions can be accurately detected.

As shown in FIG. 1, the zero-cross detection signals S11, and S12, from which any noise interference has been removed by masking circuit 8, are also fed to microprocessor 7. The periods of the pulses S11 and S12 are detected therein so that the rotational speed of the motor can be determined. Control data formed by speed detection is then output onto data bus 28, shown in FIG. 5, in order to determine the delay time T and the masking width t corresponding to each 45° interval between 0° and 45°, between 90° and 135°, between 180° and 225°, and between 270° and 315°. As described above, because pulses S11 and S12 having a correct period can be supplied through masking circuit 8, speed detection can be accurately obtained. Alternatively, speed detection could be performed by a frequency generator or a pulse generator attached to the motor.

Although in the above-described embodiment, the present invention is utilized with a two-phase bidirectional energization type sensorless brushless motor, the present invention finds equal application to a polyphase unidirectional motor or bidirectional energization type sensorless brushless motor.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A sensorless brushless motor comprising:
    a rotor having a magnet;
    an excitation coil;
    a switching circuit for performing energization switching of said excitation coil;
    a reference position detector for detecting a reference position of rotor rotation based on a voltage induced in said excitation coil by said magnet;
    a delay circuit for producing a delay clock signal having clock pulses delayed by a predetermined amount from the reference position detected by said reference position detector;
    a delay pulse signal forming circuit for forming a delay pulse signal based on the delay clock signal from said delay circuit;
    a switching signal generator for generating an energization switching signal based on the delay pulse signal and supplying the switching signal to said switching circuit; and
    a control circuit for detecting a rotational speed of said rotor for controlling the amount of delay in said delay circuit, and adjusting the energization switching position to said excitation coil in accordance with the rotational speed of said rotor.

2. A motor according to claim 1, wherein said switching circuit comprises a plurality of transistors.

3. A motor according to claim 1, wherein said reference position detector comprises a zero-cross comparator.

4. A motor according to claim 1, wherein said delay circuit comprises a counter with said delay clock signal produced at a selected output thereof.

5. A motor according to claim 1, wherein said delay pulse signal forming circuit comprises a flip-flop.

6. A motor according to claim 1, wherein said control circuit comprises a microprocessor.

7. A motor according to claim 1, wherein said excitation coil and said switching circuit form a polyphase unidirectional energization of said motor.

8. A motor according to claim 1, wherein said excitation coil and said switching circuit form a polyphase bidirectional energization of said motor.

9. A sensorless brushless motor comprising:
    a rotor;
    an excitation coil;
    a switching circuit for performing energization switching of the excitation coil;
    a reference position detector for detecting a reference position of rotor rotation based on a voltage induced in said excitation coil by said rotor;
    a delay circuit for producing a delay clock signal having pulses delayed by a predetermined amount from the reference position detected by said reference position detector;
    a delay pulse signal forming circuit for producing a delay pulse signal based on the delay clock signal from said delay circuit;
    a switching signal generator for generating an energization switching signal fed to said switching circuit in response to the delay pulse signal; and
    a masking circuit for forming a noise masking signal based on at least the delay clock signal for suppressing noise pulses in a detection output of said reference position detector at the reference position.

10. A motor according to claim 9, wherein said masking circuit forms the noise masking signal with predetermined masking width based on the delay clock signal and the detection output of the reference position immediately after the detection of the reference position and generation of the switching signal.

11. A motor according to claim 9, further comprising a masking gate circuit receiving a detected reference position from said reference position detector and said noise masking signal, and producing a pulse signal from which the noise pulses are removed and being fed to said delay pulse signal forming circuit.

12. A motor according to claim 11, further comprising leading and trailing edge detectors for producing edge pulses fed to said masking gate circuit based on the detected reference position from said reference position detector.

13. A motor according to claim 9, further comprising a control circuit for detecting a rotational speed of said rotor for controlling a delay amount of said delay circuit and adjusting an energization switching position of said excitation coil in accordance with the detected rotational speed of said rotor.

14. A motor according to claim 13, wherein said control circuit comprises a microcomputer.

15. A motor according to claim 9, wherein said switching circuit comprises a plurality of transistors connected in a bridge network to said excitation coil.

16. A motor according to claim 9, wherein said reference position detector comprises a zero-cross comparator.

17. A motor according to claim 9, wherein said delay circuit comprises a delay counter with said delay clock signal being produced at a selected output thereof.

18. A motor according to claim 9, wherein said delay pulse signal forming circuit comprises a flip-flop.

19. A motor according to claim 9, wherein said masking circuit comprises a masking counter.

20. A motor according to claim 10, further comprising a control circuit for varying the masking width in accordance with a rotational speed of said motor.

* * * * *